United States Patent [19]

Pommier et al.

[11] Patent Number: 4,729,878
[45] Date of Patent: Mar. 8, 1988

[54] VERTICAL AUTOCLAVE

[75] Inventors: Yves Pommier, Lyons; Yves Legrand, Saint-Priest, both of France

[73] Assignee: Atochem, France

[21] Appl. No.: 850,286

[22] Filed: Apr. 10, 1986

[30] Foreign Application Priority Data

Apr. 11, 1985 [FR] France ................ 85 05429

[51] Int. Cl.[4] .............. B01F 3/08; B01F 3/14; B01J 14/00
[52] U.S. Cl. .................... 422/135; 366/295; 366/330; 366/343; 422/225; 422/310
[58] Field of Search .......... 366/295, 314, 330, 343; 422/135, 224, 225, 310

[56] References Cited

U.S. PATENT DOCUMENTS

| | | | |
|---|---|---|---|
| 2,436,767 | 2/1948 | Gerlicher | 422/135 |
| 3,250,519 | 5/1966 | Herfeld | 366/314 |
| 3,486,865 | 12/1969 | Furusawa et al. | 422/135 |
| 4,147,437 | 4/1979 | Jonqueres | 366/330 |
| 4,450,141 | 5/1984 | Linde | 422/225 |
| 4,544,281 | 10/1985 | Wilkinson | 366/343 |
| 4,601,583 | 7/1986 | Amorese | 366/330 |

Primary Examiner—Michael S. Marcus
Attorney, Agent, or Firm—Sigalos & Levine

[57] ABSTRACT

A vertical autoclave for carrying out operations involving a medium having a liquid phase and/or a solid phase includes:

(a) a concave autoclave bottom;
(b) a shaft along a vertical axis of said autoclave, said shaft passing through said bottom of said autoclave; and
(c) stirrers for driving said medium with a centripetal motion about said concave autoclave bottom.

20 Claims, 10 Drawing Figures

VERTICAL AUTOCLAVE

BACKGROUND OF THE INVENTION

The present invention relates to a vertical autoclave which can be used to carry out any operations involving a medium comprising a liquid phase and/or a solid phase and especially for the bulk manufacture of vinyl chloride-based polymers and copolymers. It also relates to a process for the bulk manufacture of vinyl chloride-based polymers and copolymers, implemented with the use of the said autoclave.

The bulk polymerization of a monomer composition based on vinyl chloride starts with a liquid monomer composition. Because of the insolubility of the polymer or of the copolymer in the monomer composition, the reaction product separates out in a solid state during the polymerization, in the form of particles which are kept suspended in the liquid monomer composition by the application of agitation; as by stirring, to the reaction medium. When the polymer or copolymer content in the reaction medium reaches a value of the order of 15% by weight, its consistency becomes similar to that of stirred curdled milk. This consistency increases until the monomer composition no longer forms a continuous liquid phase, and this occurs as soon as the polymer or copolymer content in the reaction medium reaches a value of the order of 25% by weight, beyond which value the reaction medium is in a pulverulent state. The reaction medium is maintained in this state by virtue of the continuation of the agitation, as by stirring, which prevents the reaction product from setting solid, until the polymer or the copolymer is obtained in a pulverulent state at the end of polymerization, after the unreacted monomer composition has been degassed.

In the present application, the expression "monomer composition based on vinyl chloride" or more briefly, "monomer composition" refers to vinyl chloride by itself or mixed with at least one other monomer which can be copolymerized with vinyl chloride. The said monomer composition based on vinyl chloride contains at least 70% by weight of vinyl chloride. As monomers which can be copolymerized with vinyl chloride there may be mentioned, especially, vinyl acetate and low molecular weight olefins such as, for example, ethylene and propylene.

Bulk polymerization of a monomer composition based on vinyl chloride is generally carried out in the presence of at least one polymerization initiator which generates free radicals such as, for example, an organic peroxide or an azo compound.

When the required degree of conversion of the monomer composition has been obtained, the polymerizate obtained is subjected to a degassing treatment, carried out with stirring, and intended to separate the unreacted monomer composition from the polymers or copolymers.

The pulverulent polymer or copolymer obtained after degassing the unreacted monomer composition is brought to atmospheric pressure by means of an inert gas, such as nitrogen, before its exposure to open air, which is generally followed by a screening operation.

The purpose of the screening operation, which is carried out continuously on an industrial scale, is to separate the correct product, defined as that which passes through a sieve with mesh openings of a given size, chosen as a function of the particle size distribution of the polymer or of the copolymer and of the use for which it is intended, from the coarse product consisting substantially of agglomerates of resin particles, of lower commercial value and defined as that which is retained on the said sieve.

It has already been proposed to carry out the manufacture of vinyl chloride-based polymers and copolymers by bulk polymerization or copolymerization in two stages, carried out in separate units by means of a process consisting of implementing the polymerization or copolymerization operations by ensuring that the rate of stirring of the reaction medium is as high as possible during a first stage, this being until a degree of conversion of the monomer composition of the order of 7% to 15% and preferably of the order of 8% to 12% is obtained, and then reducing the rate of stirring during the second stage of the reaction to a value which is as low as possible, but which still remains sufficient to ensure good heat exchanges within the reaction medium, this being done until the end of the said reaction. According to these methods, the two stages, the first carried out with high-turbulence stirring, and the second at a slow rate of stirring, are implemented in different autoclaves, the said stages, known as the prepolymerization stage in the case of the first one and as the final polymerization in the case of the second one, taking place in suitable units known as prepolymerizers and polymerizers. Also according to these methods, the second step is carried out using a reaction medium consisting either only of the monomer/polymer composition produced in the first stage of polymerization, or of the said monomer/polymer composition and an additional monomer composition based on vinyl chloride, identical or different from that used during the first stage, and one or more polymerization initiators.

This process and its alternative methods of implementation have been described in detail in French Patents and Certificates of Addition Nos. 1,382,072, 84,958, 84,965, 84,966, 85,672, 89,025 and Nos. 1,436,744, 87,620, 87,623, 87,625 and 87,626.

According to a particular method of implementing the process, the final polymerization operation is carried out in a vertical autoclave, described in French Pat. No. 73/05,537, published under No. 2,218,350, equipped with a stirring device comprising a stirrer consisting of at least one arm matching the shape of the concave bottom of the autoclave and connected to a shaft passing through the bottom of the autoclave along its axis.

The definitions of values, concepts, and expressions used in the present application are given below, to characterize, on the one hand, the autoclave and, on the other hand, any stirrer of the type consisting of at least one arm matching the shape of the concave bottom of the autoclave and connected to a shaft passing through the bottom of the autoclave along its axis.

1. The "bottom part of the autoclave" means the volume swept by rotating the stirrer about the axis of the autoclave.

2. R denotes the radius, called "radius of the autoclave", of the cross section of the internal surface of the autoclave in the plane perpendicular to its axis passing through the radius of the bottom flange of the autoclave.

3. r denotes the radius, called "radius of the shaft", of the cross section, in a plane at right angles to the axis of the autoclave, of the surface of the volume swept by rotating the shaft about the said axis.

4. $\Sigma_1$ denotes the cylindrical surface of revolution, having the autoclave axis as its axis, whose cross section in a plane (P) at right angles to the axis of the autoclave at any point O, has a radius equal to 1.05 r.

5. $\Sigma_2$ denotes the cylindrical surface of revolution, having the autoclave axis as its axis, passing through the point or points of the surface of the arm which are the furthest away from the said axis.

6. d denotes the radius of the cross section of the surface $\Sigma_2$ in the plane (P).

7. The "leading line" and "trailing line" of the arm mean the front part and the rear part, respectively, of the outline of the face of the arm, viewed from below, each part being bounded by its points of meeting with the surfaces $\Sigma_1$ and $\Sigma_2$.

8. The "front" part and "rear" part mean the front part and the rear part, respectively, in the considered direction of rotation of the stirrer.

9. (C) and (C') denote the corresponding projections DE and D'E' of the leading line and of the trailing line of the arm in the plane (P).

10. Points D and D', known as the "central" points of the projections (C) and (C'), respectively, are situated at a distance from the point O which is equal to 1.05 r.

11. The points E and E', which are separate or which coincide, called "peripheral" points of the projections (C) and (C'), respectively, are situated at a distance d from the point O.

12. e denotes the distance from the central point D of the projection (C) to the central point D' of the projection (C').

13. The "angle of curvature" at any point F of the projection (C) means the angle $\overline{OX, FY}$ formed by the straight line OX passing through the point F pointing in the direction from point O to point F and by the tangent FY, at point F, to the projection (C), pointing in the direction corresponding to the movement, on the projection (C), of the central point D to the peripheral point E, the said angle being taken as positive in the considered direction of rotation.

14. Using a linguistic convention, the term "tangent", at a point of the projection (C), is used regardless of whether the said point forms part of a curved section or of a rectilinear section of the said projection. In the case where the said point forms part of a rectilinear section of the said projection, the tangent to the said projection, at any point of the said rectilinear section, denotes the straight line which carried the said rectilinear section.

15. The "front face" of the arm means the front part of the arm bounded by the line of its points of meeting with the surface of the volume swept by rotating the stirrer about the axis of the autoclave and with the surface $\Sigma_1$.

16. The "contour" of the front face of the arm means the line of the points bounding the front face of the arm.

17. The "lower line" and "upper line" of the arm mean the lower part and the upper part, respectively, of the contour of the front face of the arm, each part being bounded by its point of meeting with surface the $\Sigma_1$ and by the highest point of the said contour situated on the surface $\Sigma_2$.

18. An "elevation" projection and an "elevation" view mean the projection, in any plane (Q) passing through the axis of the autoclave, obtained by folding back, in the said plane (Q), along the circular arcs centered on the axis of the autoclave.

19. (G) and (G') denote the respective elevation projections HJ and H'J of the lower line and of the upper line of the arm in the plane (Q), the said elevation projections being called, respectively, more briefly, "projection" (G) and "projection" (G').

20. The points H and H', called the "central" points of the projections (G) and (G'), respectively, are situated at a distance from the axis of the autoclave which is equal to 1.05 r.

21. The point J common to the projections (G) and (G'), called the "extreme peripheral" point of the projection (G) and/or of the projection (G'), is situated at a distance d from the axis of the autoclave.

22. h denotes the distance from the joint J to the radius of the autoclave flange, which distance is measured in the vertical direction and taken as positive from the bottom upwards starting from the radius of the flange, taken as origin.

23. e' denotes the distance from the central point H of the projection (G) to the central point H' of the projection (G').

24. S denotes the surface area of the surface bounded by the elevation projection of the contour of the front face of the arm.

25. (s) denotes the cross section of the surface of the arm in a plane at right angles to its leading line at any point M.

26. M', N and N' denote the points of meeting of the cross section (s) and, respectively, of the trailing line and of the lower and upper lines of the contour of the front face of the arm.

27. $a_1$, $a_2$, $a_3$, and $a_4$ denote the apexes of the rectangle, with two horizontal sides, circumscribed on the cross section (s).

28. $a_1$, $a_2$, $a_3 a_4$, $a_1$ and $a_2 a_3$ denote the sides of the said rectangle on which the points M, M', N and N' are situated, respectively, whatever the shape of the cross section (s).

29. Each of the arms of any stirrer of this type employed until now, called, in the present description, "stirrer Bo", has the following characteristic: the projections (C) and (C') of its leading line and of its trailing line, respectively, are rectilinear, parallel and arranged so that the point O is situated between the straight lines which produce it. Whatever the considered direction of rotation of the said stirrer Bo, the angle of curvature α at any point F on the projection (C) is negative. When rotating in either of the two directions of its rotation, the prior art said stirrer Bo drives the medium with a centrifugal motion; away from the axis, in the lower part of the autoclave.

The power consumed by the prior art stirrer Bo at certain critical stages of the process, especially at the end of the polymerization operation and during the degassing treatment of the polymerizate, makes it necessary to provide the said stirrer with a relatively large drive unit.

SUMMARY OF THE INVENTION

The autoclave according to the invention does not have the above-mentioned disadvantages.

Briefly, the present invention comprises a vertical autoclave to carry out operations involving a medium having a liquid phase and/or a solid phase comprising:
(a) a concave autoclave bottom,
(b) a shaft along a vertical axis of said autoclave, said shaft passing through said bottom of said autoclave, and (c) stirrer means connected to said shaft for driving said medium with a centripetal motion about said concave autoclave bottom.

The invention also comprise the process for the bulk manufacture of vinyl chloride-based polymers comprising carrying out the polymerization in two stages; the second stage being carried out in the autoclave of the instant invention is more particularly set forth hereinafter.

DETAILED DESCRIPTION

According to the invention, stirrer of the present invention (hereinafter referred to as the "instant stirrer") is capable of driving the medium with a centripetal motion in the lower part of the autoclave. Preferably, the autoclave with a vertical axis which is the subject of the invention is equipped with a stirring device of the type comprising a stirrer consisting of at least one arm matching the shape of the concave bottom of the autoclave and connected to a shaft passing through the bottom of the autoclave along its axis.

Preferably, the instant stirrer is capable of driving with a centripetal motion at least any component unit of the volume of the medium that is situated in the minimum working region of the lower part of the autoclave.

A "minimum working" region or zone of the lower part of the autoclave means, in the present description, the region or zone of the part of the autoclave bounded by the cylindrical surfaces of revolution, having the axis of the autoclave as their axis, whose cross section, in a plane (P) perpendicular to axis, has a radius which is equal, in the first case, to r+0.2 d and, in the other case, to 0.9 d.

The instant stirrer is capable of fulfilling the indicated function in one of its two directions of rotation, denoted by the "appropriate" direction of rotation of the side stirrer, as hereinafter described.

It has been found, in fact, that the maximum power consumed by the instant stirrer is when the instant stirrer is rotating in the appropriate direction of rotation at a given rate of rotation, during the final polymerization operation of the process for the bulk manufacture of vinyl chloride-based polymers and copolymers in two stages carried out in separate units and during the degassing treatment of the polymerizate obtained, is less than the maximum power consumed, everything else being equal, during the rotation of a prior art stirrer Bo corresponding to the instant stirrer, in the appropriate direction of rotation of the prior art stirrer Bo.

Figure 1:
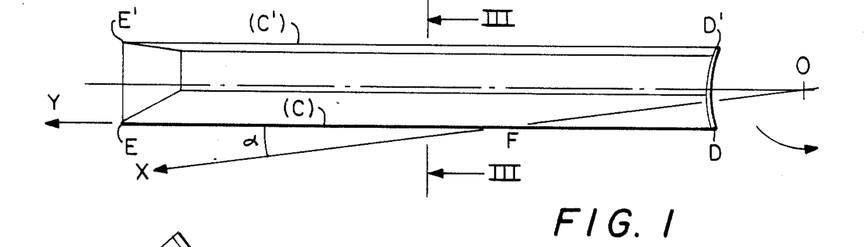
FIG. 1 top plan view of a prior art stirrer arm.
Figure 2:
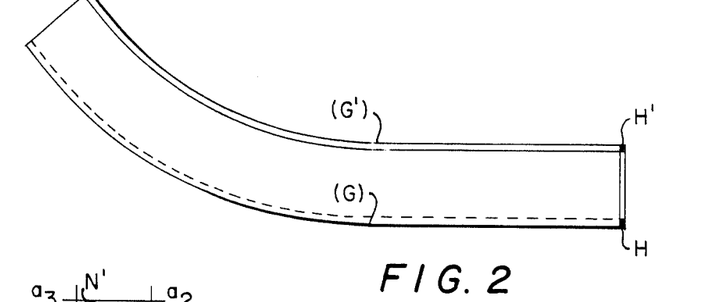
FIG. 2 front elevation view of a prior art stirrer arm.
Figure 3:
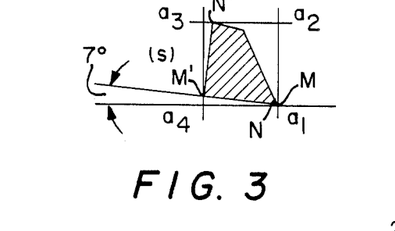
FIG. 3 side cross-sectional view of prior art stirrer arm taken along line III—III of FIG. 1.

FIGS. 1, 2, and 3 of the drawings show views of an arm of a prior art stirrer Bo given by way of a typical example.

FIG. 1 is a plan view showing projections (C) and (C') are rectilinear and symmetrical relative to a straight line passing through O.

FIG. 2 is an elevation front view of a stirrer Bo.

FIG. 3, the section III—III is a right-angled trapezium in which the apex of the acute angle is situated on the leading line DE and on the lower line of the contour of the front face of the arm, said lines being coincident, and in which the large base, equal to the height, twice the length of the small base, forms an angle of 7 degrees to the horizontal.

In the present description, the prior art stirrer Bo "corresponding" to the instant stirrer means any stirrer Bo whose shape and dimensions are such that:
it comprises as many arms as the instant stirrer and their mutual angular arrangement is that of the arms of the instant stirrer or the symmetrical arrangement by reflection,
the radius r of its shaft is equal to the radius of the shaft of the instant stirrer, and
the distances d and h and the surface area S relative to each of its arms are equal, respectively, to those relative to the arm of the corresponding angular arrangement of the instant stirrer.

In the present description, the "appropriate" direction of rotation of the prior art stirrer Bo corresponding to the instant stirrer means the direction of rotation in which the power consumed is the lowest, everything else being equal.

Figure 4:
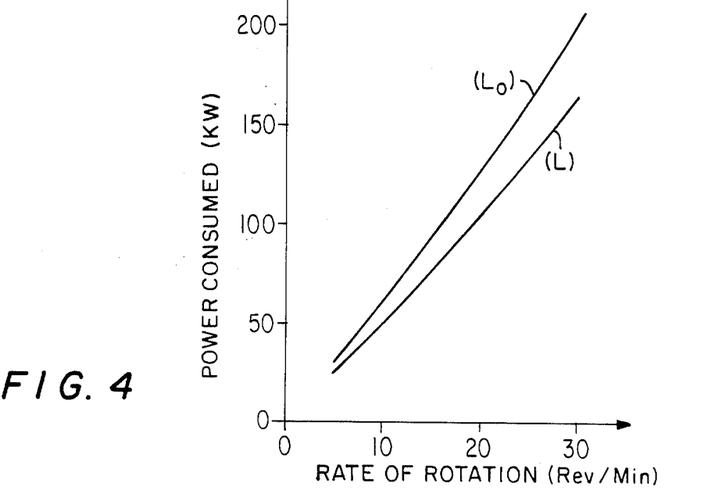
FIG. 4 graph showing plotted curves of power consumed by the stirrer means of the present invention, curve (L), and the prior art stirrer Bo curve (Lo), where the ordinate is power consumed (KW) and the abscissa is the rate of rotation (rev/min).

It has been found that the observed power reduction, during the degassing of the unreacted monomer composition, in the case, for example, of a vinyl chloride-based polymer whose apparent density lies between 0.55 g/cm$^3$ and 0.65 g/cm$^3$ and whose mean particle diameter is between 100 and 150 μm, is from 15% to 20%. FIG. 4 of plate 2 of the attached drawing shows, by way of example, curves showing the value of the power consumed (kW) plotted as the ordinate, as a function of the rate of rotation (rev/min) of the instant stirrer, plotted as the abscissa, for the rotation of the said stirrer in said polymer held in an autoclave with a capacity of 36 m$^3$. In FIG. 4, the curves (L) and (Lo) relate, respectively, to a stirrer according to the invention and to a prior art stirrer BO corresponding to the instant stirrer.

This makes it possible, at a given power, and thus without recourse to a larger stirrer drive unit, to use autoclaves of larger capacity. It has been found, for example, that it is possible to carry out the final polymerization operation and the treatment of degassing the polymerizate obtained in an autoclave according to the instant invention, with a capacity of 65 m$^3$, under stirring conditions such that, everything else being equal, the maximum power consumed is not higher than the maximum power consumed in an autoclave with a capacity of 50 m$^3$ fitted with a prior art stirrer Bo.

It has also been found that the proportion by weight of the correct product obtained while using the instant stirrer is generally greater than that obtained, everything else being equal, when using a prior art stirrer Bo corresponding to the instant stirrer.

It has also been found that the turnover time of the said polymer, relative to a stirrer according to the invention, is much shorter than the turnover time relative to a prior art stirrer Bo corresponding to the instant stirrer according to the invention and can be 5 times shorter than the latter.

The turnover time is the time required to obtain a homogeneous dispersion of a colored portion of the said polymer in the remaining, uncolored, portion by rotation, at a specified rate of rotation, of the stirrer considered. The quantity of polymer used represents approximately 0.4 t per m³ of autoclave capacity. The colored portion of the polymer represents 1% by weight of the quantity of polymer used. The stirring is started up after addition of the colored polymer into the autoclave containing the uncolored polymer. The moment at which a homogeneous dispersion is obtained is defined as that when the polymer color, observed visually, becomes uniform. The turnover time is that which separates the instant when the stirring is started up from the instant when the homeogeneous dispersion is obtained.

The turnover time relative to the stirrer according to the invention is determined by rotating the instant stirrer in the said polymer held in the said autoclave.

The turnover time relative to the prior art stirrer Bo is determined by rotating the said stirrer in the said polymer held in the said autoclave, when the instant stirrer is replaced by the prior art stirrer Bo.

The turnover time is that obtained by rotating the instant stirrer in the appropriate direction of rotation.

An advantageous alternative embodiment of the instant stirrer is a stirrer with an arm of a curved shape.

Referring to the drawings, a stirrer with an "arm of a curved shape" means, in the present description, a stirrer in which a central angle $\phi$ (as defined below) of the minimum working part (as defined below) of the projection (C) of the leading line of the stirrer arm, in one of the two directions of rotation of the said stirrer, is between +5 and +90 degrees.

Figure 7:
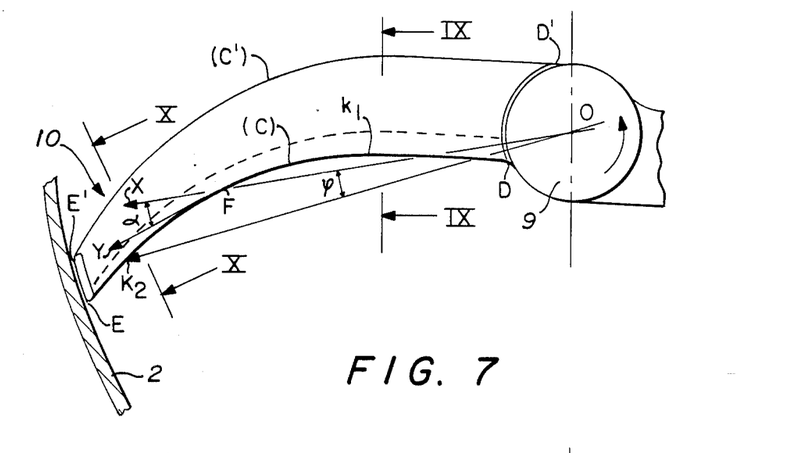
FIG. 7 top plan view of the stirrer arm of the present invention and axial shaft.

The "minimum working part" of the projection (C) means, in the present description as shown in FIG. 7, the part $K_1 K_2$ of the projection (C), said part $K_1 K_2$ being shown in FIG. 7 as the projection, in the plane (P), of the part of the leading line situated inside the minimum working zone (as previously defined) and bounded by its points of meeting of the surface of the said zone.

The points $K_1$ and $K_2$ called, respectively, the "central" point and the "peripheral" point of the minimum working part of the projection (C), are situated at a distance from the point O which is equal, in the case of the point $K_1$, to $r + 0.2 d$ and, in the case of point $K_2$, to $0.9 d$.

The "central angle $\phi$", as shown in FIG. 7, of the minimum working part of the projection (C) means, in the present description, the angle $\overrightarrow{OK_1}, \overrightarrow{OK_2}$, taken as positive in the said direction of rotation.

Depending on whether the said direction of rotation is the clockwise direction of rotation or the anticlockwise direction of rotation as shown in FIG. 7 by arrow 20 an "arm with a shape curved to the right" or an "arm with a shape curved to the left" or, more briefly, "arm curved to the right" or "arm curved to the left".

The said direction of rotation is the "appropriate" direction of rotation of the stirrer according to the invention; (i.e., clockwise for an arm curved to the right and counterclockwise for an arm curved to the left).

According to an embodiment which is given by way of being a preferred one, of the arm with a curved shape, the angle of curvature $\alpha$, at any point F on the minimum working part of the projection (C), is between 0 and +90 degrees.

According to an embodiment which is given by way of being more highly preferred, of the arm with a curved shape, the angle of curvature $\alpha$ at any point F on the minimum working part of the projection (C), is between +8 and +45 degrees.

The angle of curvature $\alpha$ may be variable, continually increasing or continually decreasing, for example, or constant, from the central point $K_1$ to the peripheral point $K_2$ of the minimum working part of the projection (C).

The value of the angle of curvature $\alpha$ at the point F determines, everything else being equal, the value, relative to said arm, of the centripetal flowrate of the medium through the cylindrical surface of revolution whose axis is the axis of the autoclave and which passes through the point F. The centripetal flowrate is zero when the angle of curvature $\alpha$ is zero or equal to +90 degrees and is maximum when the angle of curvature $\alpha$ is equal to +45 degrees. It is an increasing function of the angle of curvature $\alpha$, when the angle of curvature $\alpha$ increases from 0 to +45 degrees. It is a decreasing function of the angle of curvature $\alpha$ when the angle of curvature increases from +45 to +90 degrees.

By way of example, the angle of curvature $\alpha$ can be substantially constant from the central point $K_1$ to the peripheral point $K_2$ of the minimum working part of the projection (C).

"Substantially constant" is to be understood to mean that the angle of curvature $\alpha$ does not differ from an average value by more than 5 degrees.

A description of a stirrer with an arm of a curved shape according to the embodiment given by way of being a preferred one, of the said arm of curved shape, is given below.

The radius r is generally between 0.10 R and 0.25 R.

The distance d, at most slightly less than R, is generally at least equal to 0.5 R.

The ratio r/d is generally between 0.1 and 0.5.

The distance h is generally between $-0.65$ R and $+0.30$ R.

The choice of the shape of the projection (C') and of its position relative to the projection (C) is not critical.

The distance e is generally at most equal to 2 r and preferably between 0.75 r and 1.50 r.

The distance e' is generally between 0.05 R and 0.5 R.

The surface area S is generally between $0.1 R^2$ and $0.5 R^2$.

The shape of the cross section (s) is not critical. By way of example, the cross section (s), at any point M on its leading line whose projection in the plane (P) is a point situated on the minimum working part of the projection (C), is such that:

the ratio of the distances $Ma_1/a_1a_2$ is less than 0.20 and preferably less than 0.05, the part MN' of the said cross section, situated on the front face of the stirrer arm, has, essentially, a substantially rectilinear profile forming, with the side $a_1a_2$, an angle $\beta$ which is zero or at most equal to 45 degrees at the point on the leading line whose projection in the plane (P) is the central point $K_1$ of the minimum working part of the projection (C), and gradually decreasing, when the point M moves along the leading line in the direction corresponding to the movement from the central point $K_1$ to the peripheral point $K_2$ of the minimum working part of the projection (C), to a value which is eventually zero, the ratio of the distances $Na_1/a_1a_4$ is less than 0.20 and preferably less than 0.15, and the part NM' of the said cross section, situated on the face, visible from below, of the stirrer arm, has essentially a substantially rectilinear profile forming, with the side $a_1a_4$ an angle $\gamma$ of between 3 and 10 degrees and preferably between 5 and 10 degrees.

For reasons of a mechanical nature, the cross section (s) is such that, when the point M moves along the leading line in the direction corresponding to the movement from the central point D to the peripheral point E of the projection (C), the length of the sides of the rectangle with two horizontal sides, circumscribed on the cross section (s), is preferably decreasing.

The instant stirrer advantageously comprises several arms, preferably identical in shape, their number not being limited. In the case where the instant stirrer comprises several arms, each of them is designed and arranged so that the appropriate direction of rotation of each of the instant stirrers, which comprised each of the arms taken separately, is the same for all the said instant stirrers. The said arms are generally arranged in a uniform manner around the axis of the autoclave. Thus, in the case of two arms, these are preferably arranged symmetrically relative to the axis of the autoclave; when the instant stirrer has three arms, these form a mutual angle of 120 degrees, taken pair-by-pair.

The stirring device in the autoclave according to the invention can also comprise at least one other stirrer, the other stirrer or the other stirrers and the instant stirrer being controlled independently. The other stirrer may have a rotary shaft passing through the top part of the autoclave. The stirring device can comprise a single other stirrer, with a rotary shaft directed, preferably, along the axis of the autoclave. It may also comprise several other stirrers arranged, preferably, in a regular manner around the axis of the autoclave.

The other stirrer may be of a type which essentially consists of a band wound in helical turns about the said rotary shaft. It is then capable of driving the reaction medium with a rising motion in one of the two directions or rotation, denoted by the "appropriate" direction of rotation of the said stirrer. Depending on the design of the instant stirrer and that of the other stirrer, the appropriate direction of rotation of the other stirrer is the same as that of the instant stirrer or the direction opposite to the appropriate direction of rotation of the instant stirrer. The other stirrer may be, in particular, such as described in French Pat. No. 75/32,124, published under No. 2,328,722.

The instant stirrer and the other stirrer may be hollow and may carry a coolant fluid.

Figure 5:
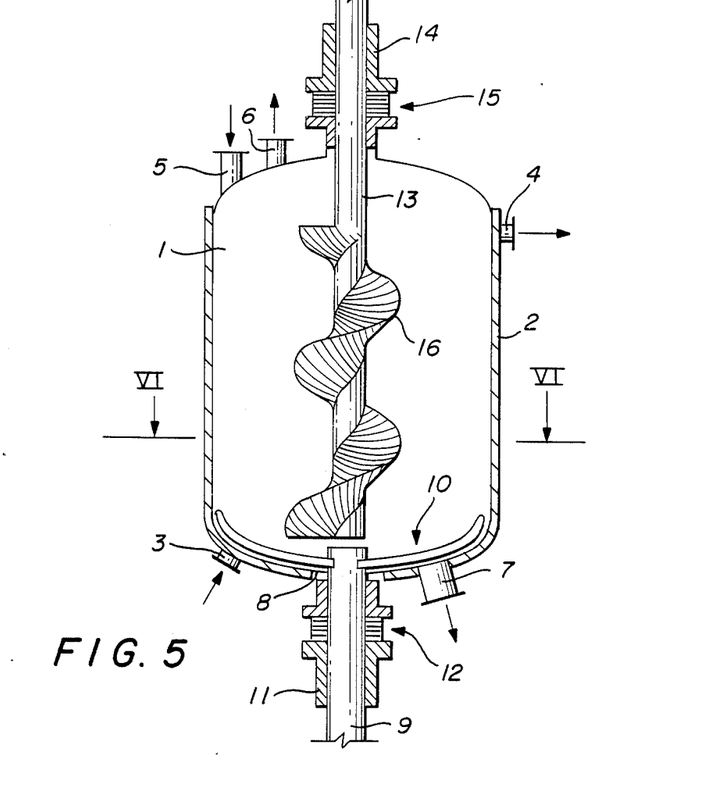
FIG. 5 partial cross-sectional view of the autoclave of the present invention with stirrer in place.
Figures 8, 9, 10:
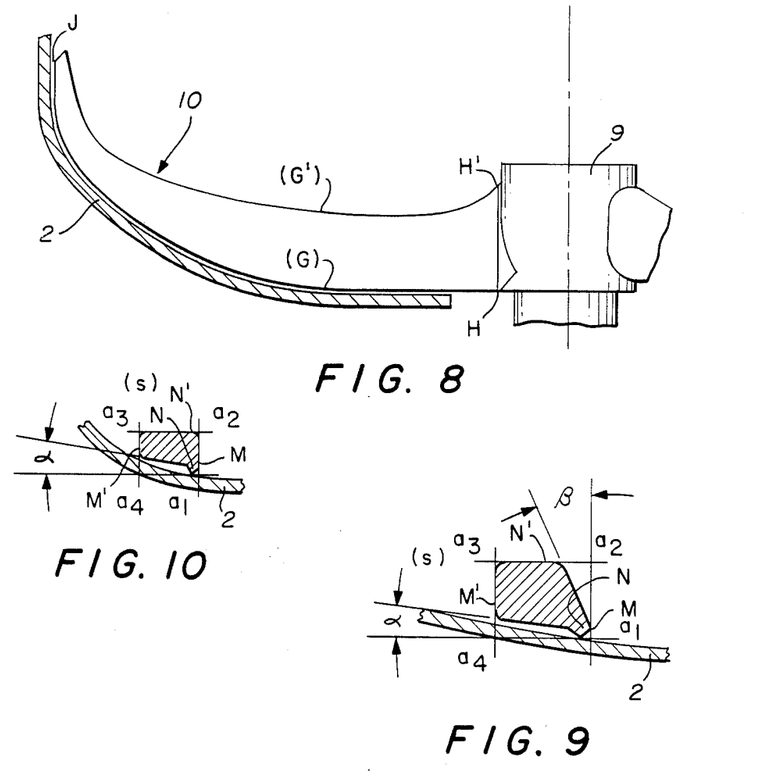
FIG. 8 front elevation view of stirrer arm of the present invention and axial shaft.
FIG. 9 cross-sectional view of stirrer arm taken along line IX—IX of FIG. 7.
FIG. 10 cross-sectional view of stirrer arm taken along line X—X of FIG. 7.

A description of an embodiment of an autoclave according to the invention is given below, by way of example, with reference to FIGS. 5 and 10 of the drawings.

The autoclave is fitted with a stirring device comprising the instant stirrer with two arms curved to the left and another stirrer, with a rotary shaft passing through the upper part of the autoclave along its axis, the stirrer according to the invention and the other stirrer being controlled independently.

The autoclave 1, with a vertical axis, is surrounded by jacket 2 in which a heat exchange fluid which enters through a pipe 3 and leaves through a pipe 4 is circulated. In its upper part, the autoclave 1 comprises a pipe 5 for charging the prepolymerizate, the required reactants and, if appropriate, monomers, and a pipe 6 for removing the unreacted monomer composition at the end of the operation. In its lower part, the autoclave 1 has a pipe 7 for discharging the polymer.

Figure 6:
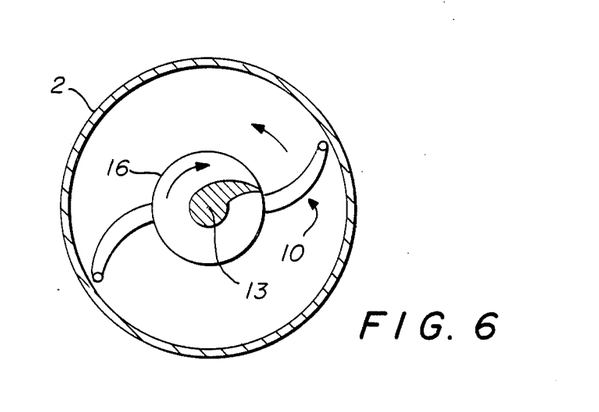
FIG. 6 cross-sectional view of the autoclave taken along line VI—VI of FIG. 5.

Passing through the bottom 8 of the autoclave 1 is a shaft 9 to which there are attached two arms 10 arranged symmetrically relative to the axis of the autoclave, and which is supported by the bearing 11, the sealing between the shaft 9 and the bottom of the autoclave being ensured by the sealing device 12 consisting of a stuffing box or a mechanical seal.

Passing through the upper part of the autoclave 1 along the axis of the autoclave is a rotary shaft 13 supported by the bearing 14, the sealing between the rotary shaft and the upper part of the autoclave being ensured by means of a sealing device (stuffing box or mechanical seal) 15. A band 16 of the type described in French Pat. No. 75/32,124, published under No. 2,328,722 is wound in helical turns on the rotary shaft 13.

The autoclave according to the invention is especially suitable for implementing the final polymerization or copolymerization operation in the process for the bulk manufacture of vinyl chloride-based polymers and copolymers in two stages which are carried out in separate unit.

According to an alternative embodiment of the process of the invention, a polymerization or copolymerization operation is carried out in a first stage with high-turbulence stirring, on a monomer composition based on vinyl chloride, until a degree of conversion of the monomer composition of 3% to 15% is obtained, an additional quantity of a monomer composition based on vinyl chloride, which is identical to or different from that used during the first stage is added to the reaction medium, if appropriate, and then a final polymerization or copolymerization operation is carried out during the second stage, on the reaction medium thus formed, at a slow rate of stirring in the autoclave according to the invention.

According to the said alternative embodiment, during the second stage, the reaction medium is subjected to the action of a stirrer with a rotary shaft passing through the upper part of the autoclave and directed along the axis of the autoclave, consisting essentially of a band wound in helical turns on the said rotary shaft, the said stirrer forming a stirring zone around the axis of the autoclave, and to the action of the instant stirrer forming, simultaneously and independently, another stirring zone in the lower part of the autoclave.

According to the said alternative embodiment, the reaction medium is driven with a centripetal motion by the instant stirrer, in the lower part of the autoclave.

Any polymerization initiators capable of being employed for the bulk manufacture of vinyl chloride-based polymers and copolymers may be used according to the process of the invention and, in general, free radical generators such as organic peroxides such as lauroyl peroxide, acetyl cyclohexanesulphonyl peroxide, isobutyryl peroxide, dichloroacetyl peroxide, trichloroacetyl peroxide; peroxydicarbonates such as ethyl peroxydicarbonate, ethylhexyl peroxydicarbonate, isopropyl peroxydicarbonate or isobutyl peroxydicarbonate; tert-butylperoxy methoxyacetate; tert-butylperoxyethoxyacetate; tert-butylperoxy 2-phenoxypropionate; and azo compounds such as 2,2′-azobis(2,4 dimethylvaleronitrile). In general 0.001 to 0.006% by weight relative to the total monomer composition employed, of the polymerization initiator or initiators are used, expressed as active oxygen.

The polymerization temperature is generally between 10° and 80° C. and preferably between 30° and 70° C.

The invention will be further described in connection with the following examples which are set forth for purposes of illustration only.

Examples 1, 3, 5, 7, 9, 11, 12, and 14 are according to the instant invention.

Examples 2, 4, 6, 8, 10, 13, and 15 are given by way of comparison.

For each of the autoclaves, called polymerizers, of a given capacity and used in the examples and fitted with a stirring device comprising the instant stirrer or a prior art stirrer Bo, the characteristics of the said stirrers are shown in Table I.

The said autoclaves are made of stainless steel and fitted with a jacket. The stirring device also comprises another stirrer consisting of a band wound in helical turns on a rotary shaft passing through the upper part of the autoclave along its axis, as described in French Pat. No. 75/32,124, published under No. 2,328,722.

For each stirring device, the appropriate direction of rotation of the other stirrer is the direction opposite to the appropriate direction of rotation of the instant stirrer or of the corresponding prior art stirrer Bo.

In all the examples the direction of rotation of each stirrer is the appropriate direction of rotation of the said stirrer.

Examples 1 to 11 relate to the bulk manufacture, in two stages, carried out in separate units, of vinyl chloride-based polymers or copolymers. In each of the said examples, the second polymerization stage is carried out in one of the said autoclaves.

The correct product is defined as that which passes through a sieve with a mesh opening of 315 $\mu$m.

The viscosity index of the vinyl chloride-based polymers and copolymers is determined in accordance with the international standars ISO 174.

EXAMPLES 1 AND 2

135 kg of vinyl chloride are introduced into a prepolymerizer 200 liters in capacity, made of stainless steel and fitted with a stirrer consisting of a "lightnin" turbine with 6 flat paddles, and the apparatus is purged by degassing with 10 kg of vinyl chloride. 16.6 g of ethyl peroxydicarbonate are also added, corresponding to 1.5 g of active oxygen. The rate of stirring is set at 500 rev/min.

The temperature of the reaction medium in the prepolymerizer is raised and maintained at 71° C., which corresponds to a relative pressure of 12 bars in the prepolymerizer.

After 15 minutes' prepolymerization, the degree of conversion being in the region of 8%, the prepolymerizate is transferred to the vertical polymerizer 0.4 m³ in capacity, purged beforehand by degassing with 20 kg of vinyl chloride and containing 130 kg of vinyl chloride, 22.25 g of ethyl peroxydicarbonate, corresponding to 2 g of active oxygen, and 75 g of lauroyl peroxide, corresponding to 3 g of active oxygen. The rate of rotation of the instant stirrer (Example 1) or of the prior art stirrer Bo (Example 2) is set at 30 rev/min, and that of the other stirrer at 50 rev/min. The temperature of the reaction medium is raised over 15 minutes, and then maintained at 69° C., which corresponds to a relative pressure of 11.5 bars in the polymerizer. After reaching the temperature, the polymerization in the polymerizer takes 3.5 hours.

Degassing of the unreacted monomer is then carried out. After degassing and breaking the vacuum with nitrogen, the polyvinyl chloride obtained is collected.

EXAMPLES 3 AND 4

The prepolymerization is carried out as in Example 1.

After 15 minutes' prepolymerization, the degree of conversion being in the region of 8%, the prepolymerizate is transferred to the vertical polymerizer 0.4 m³ in capacity, purged beforehand by degassing with 20 kg of vinyl chloride and containing 130 kg of vinyl chloride, 27.8 g of acetylcyclohexanesulphonyl peroxide, corresponding to 2 g of active oxygen, and 22.25 g of ethyl peroxydicarbonate, corresponding to 2 g of active oxygen. The rate of rotation of the instant stirrer (Example 3) or of the prior art stirrer Bo (Example 4) is set at 30 rev/min and that of the other stirrer at 50 rev/min. The temperature of the reaction medium is raised over 15 minutes, and then maintained at 55° C., which corresponds to a relative pressure of 8.1 bars in the polymerizer. After the temperature has been reached, the polymerization in the polymerizer takes 4 hours.

Degassing of the unreacted monomer is then carried out. After degassing and breaking the vacuum with nitrogen the polyvinyl chloride obtained is collected.

EXAMPLES 5 AND 6

133 kg of vinyl chloride are introduced into the prepolymerizer used in Example 1 and the apparatus is purged by degassing with 10 kg of vinyl chloride. 2 kg of vinyl acetate, 5.56 g of acetyl cyclohexanesulphonyl peroxide, corresponding to 0.4 g of active oxygen, and 13.35 g of ethyl peroxydicarbonate, corresponding to 1.2 g of active oxygen, are also added. The rate of stirring is set at 500 rev/min.

The temperature of the reaction medium in the prepolymerizer is raised and maintained at 70° C., which corresponds to a relative pressure of 11.3 bars in the prepolymerizer.

After 15 minutes' prepolymerization, the degree of conversion being the region of 8%, the prepolymerizate is transferred to the vertical polymerizer 0.4 m³ in capacity, purged beforehand by degassing with 15 kg of vinyl chloride and containing 125 kg of vinyl chloride, 5 kg of vinyl acetate and 76.4 g of acetyl cyclohexanesulphonyl peroxide, corresponding to 5.5 g of active oxygen. The rate of rotation of the instant stirrer (Example 5) or of the prior art stirrer Bo (Example 6) is set at 30 rev/min and that of the other stirrer at 50 rev/min. The temperature of the raction medium is raised over 15 minutes, and then maintained at 47° C., which corresponds to a relative pressure of 6.2 bars in the polymerizer. After reaching the temperature, the polymerization in the polymerizer takes 6.5 hours.

Degassing of the unreacted monomer composition is then carried out. After degassing and breaking the vacuum with nitrogen, a copolymer of vinyl chloride and vinyl acetate consisting of 98% by weight of vinyl chloride and 2% by weight of vinyl acetate is collected.

EXAMPLES 7 AND 8

12.5 t of vinyl chloride are introduced into a prepolymerizer 20 m³ in capacity made of stainless steel and fitted with a stirrer comprising a ship's propeller above which a turbine with 6 flat paddles is mounted, and the apparaus is purged by degassing with 1 t of vinyl chloride. 1.79 kg of ethyl peroxydicarbonate, corresponding to 160 g of active oxygen, are also added. The rate of stirring is set at 120 rev/min.

The temperature of the reaction medium in the prepolymerizer is raised and maintained at 67° C., which corresponds to a relative pressure of 11 bars in the prepolymerizer.

After 15 minutes' prepolymerization, the degree of conversion being in the region of 8%, the prepolymerizate is transferred to the vertical polymerizer 36 m³ in capacity, purged beforehand by degassing with 0.5 t of vinyl chloride and containing 7.5 t of vinyl chloride, 1.33 kg of ethyl peroxydicarbonate, corresponding to 120 g of active oxygen, and 4.48 kg of lauroyl peroxide, corresponding to 180 g of active oxygen. The rate of rotation of the instant stirrer (Example 7) or of the prior art stirrer Bo (Example 8) is set at 20 rev/min and that of the other stirrer at 30 rev/min. The temperature of the reaction medium is raised over 30 minutes, and then maintained at 70° C., which corresponds to a relative pressure of 11.9 bars in the polymerizer. After reaching the temperature, polymerization in the polymerizer takes 3.5 hours.

Degassing of the unreacted monomer is then carried out. After degassing and breaking the vacuum with nitrogen, the polyvinyl chloride obtained is collected.

EXAMPLES 9 AND 10

18 t of vinyl chloride are introduced into a prepolymerizer 30 m³ in capacity, made of stainless steel and fitted with a stirring device comprising a ship's propeller above which a turbine with 6 flat paddles is mounted, and the apparatus is purged by degassing with 1 t of vinyl chloride. 2.56 kg of ethyl peroxydicarbonate, corresponding to 230 g of active oxygen, are also added. The rate of stirring is set at 100 rev/min.

The temperature of the reaction medium in the prepolymerizer is raised and maintained at 67° C., which corresponds to a relative pressure of 11 bars in the prepolymerizer.

After 15 minutes' prepolymerization, the degree of conversion being in the region of 8%, the prepolymerizate is transferred to the vertical polymerizer 50 m³ in capacity, purged beforehand by degassing with 0.5 t of vinyl chloride and containing 11.5 t of vinyl chloride, 1.89 kg of ethyl peroxydicarbonate, corresponding to 170 g of active oxygen, and 6.47 kg of lauroyl peroxide, corresponding to 260 g of active oxygen. The rate of rotation of the instant stirrer according to the invention (Example 9) or of the prior art stirrer Bo (Example 10) is set at 15 rev/min and that of the other stirrer at 25 rev/min. The temperature of the reaction medium is raised over 30 minutes, and then maintained at 70° C., which corresponds to a relative pressure of 11.9 bars in the polymerizer. After reaching the temperature, the polymerization in the polymerizer takes 3.5 hours.

Degassing of the unreacted monomer is then carried out. After degassing and breaking the vacuum with nitrogen, the polyvinyl chloride obtained is collected.

EXAMPLE 11

23.5 t of vinyl chloride are introduced into a prepolymerizer 40 m³ in capacity, made of stainless steel and fitted with a stirring device comprising a ship's propeller above which a turbine with 6 flat paddles is mounted, and the apparatus is purged by degassing with 1.5 t of vinyl chloride. 3.34 kg of ethyl peroxydicarbonate, corresponding to 300 g of active oxygen, are also introduced. The rate of stirring is set at 65 rev/min.

The temperature of the reaction medium in the prepolymerizer is raised and maintained at 68° C., which corresponds to a relative pressure of 11.5 bars in the prepolymerizer.

After 15 minutes' prepolymerization, the degree of conversion being in the region of 8%, the prepolymerizate is transferred to the vertical polymerizer 65 m³ in capacity, purged beforehand by degassing with 1 t of vinyl chloride and containing 15 t of vinyl chloride, 2.45 kg of ethyl peroxydicarbonate, corresponding to 220 g of active oxygen, and 8.46 kg of lauroyl peroxide, corresponding to 340 g of active oxygen. The rate of rotation of the instant stirrer is set at 10 rev/min and that of the other stirrer at 23 rev/min. The temperature of the reaction medium is raised over 30 minutes, and then maintained at 70° C., which corresponds to a relative pressure of 11.9 bars in the prepolymerizer. After reaching the temperature, the polymerization in the polymerizer takes 3.5 hours.

Degassing of the unreacted monomer is then carried out. After degassing and breaking the vacuum with nitrogen, the polyvinyl chloride obtained is collected.

Tables II and III show, respectively, for each of the Examples 1 to 6 and 7 to 11:
(i) the capacity of the autoclave used as polymerizer, referred to already;
(ii) the maximum power consumed during the polymerization or the degassing treatment;
(iii) the quantity of polymer collected; and
(iv) the content by weight of the correct product.

They also indicate:
(i) the viscosity index;
(ii) the apparent density; and
(iii) the mean particle diameter, determined for the correct product.

EXAMPLES 12 AND 15

These relate to the determination of the power consumed and of the turnover time relative to the instant stirrer (Examples 12 and 14) and to the prior art stirrer Bo (Examples 13 and 15), for the rotation of the stirrer in a vinyl chloride-based polymer held in the autoclave. The apparent density of the said polymer is 0.60 g/cm³ and its mean particle diameter is 120 μm.

Table IV shows, for each of the examples, the autoclave capacity, the quantity of polymer used, the rate of rotation of the instant stirrer or of the corresponding prior art stirrer Bo, the power consumed, and the turnover time.

TABLE I

| Characteristics of the instant stirrers and of the corresponding prior art stirrers Bo | | | | |
|---|---|---|---|---|
| Autoclave capacity (m³) | 0.4 | 36 | 50 | 65 |
| Characteristics common to the instant stirrer and to the corresponding prior art stirrer Bo | | | | |
| Number of arms | 2 | 2 | 2 | 2 |
| Angular distance between arms (degrees) | 180 | 180 | 180 | 180 |
| r/R | 0.11 | 0.13 | 0.12 | 0.13 |
| d/R | 0.98 | 0.89 | 0.85 | 0.95 |
| r/d | 0.12 | 0.14 | 0.15 | 0.24 |
| h/R | +0.25 | −0.22 | −0.17 | −0.1 |

TABLE I-continued

Characteristics of the instant stirrers and of the corresponding prior art stirrers Bo

| Autoclave capacity (m³) | 0.4 | 36 | 50 | 65 |
|---|---|---|---|---|
| S/R2 | 0.14 | 0.13 | 0.15 | 0.1 |
| Characteristics specific to the instant stirrer | | | | |
| $\phi$ (degrees) | +12 | +9 | +7 | +6 |
| $\alpha$ (degrees)* | +10 to +30 | +10 to +25 | +10 to +25 | +10 to +25 |
| e/r | 1.2 | 1.1 | 1.1 | 1.1 |
| e'/R | 0.15 | 0.17 | 0.17 | 0.18 |
| $Ma_1/a_1a_2$ | 0.01 | 0.01 | 0.01 | 0.01 |
| Value of $\beta$ at point $K_1$ (degrees) | 25 | 25 | 25 | 25 |
| Minimum value of $\beta$ (degrees) | 0 | 0 | 0 | 0 |
| $Na_1/a_1a_4$ | 0.08 | 0.1 | 0.1 | 0.1 |
| $\gamma$ (degrees) | 9 | 7 | 7 | 7 |
| Characteristics specific to the prior art stirrer Bo corresponding to the instant stirrer | | | | |
| e/r | 0.9 | 1.4 | 1.3 | — |
| e'/R | 0.05 | 0.18 | 0.22 | — |

The remaining characteristics are those of the stirrer shown in FIGS. 1, 2, and 3.
*at any point F. on the part $K_1K_2$

TABLE II

| | Example according to the invention 1 | Comparative example 2 | Example according to the invention 3 | Comparative example 4 | Example according to the invention 5 | Comparative example 6 |
|---|---|---|---|---|---|---|
| Capacity of the autoclave used as polymerizer (m³) | 0.4 | 0.4 | 0.4 | 0.4 | 0.4 | 0.4 |
| Maximum power consumed (kW) | 6 | 7.5 | 6.1 | 7.8 | 5.7 | 7.1 |
| Quantity of polymer collected (kg) | 180 | 180 | 160 | 160 | 200 | 200 |
| Weight content of correct product (%) | 93 | 92 | 94 | 93 | 88 | 85 |
| Viscosity index | 78 | 78 | 108 | 108 | 142 | 142 |
| Apparent density (g/cm³) | 0.58 | 0.58 | 0.57 | 0.56 | 0.50 | 0.50 |
| Mean particle diameter (μm) | 110 | 110 | 130 | 130 | 120 | 120 |

TABLE III

| | Example according to the invention 7 | Comparative example 8 | Example according to the invention 9 | Comparative example 10 | Example according to the invention 11 |
|---|---|---|---|---|---|
| Capacity of the autoclave used as polymerizer (m³) | 36 | 36 | 50 | 50 | 65 |
| Maximum power consumed (kW) | 105 | 126 | 132 | 160 | 160 |
| Quantity of polymer collected (t) | 12.7 | 12.5 | 19.1 | 19 | 23 |
| Weight content of correct product (%) | 98 | 96 | 98 | 96 | 98 |
| Viscosity index | 78 | 78 | 78 | 78 | 79 |
| Apparent density (g/cm³) | 0.60 | 0.60 | 0.60 | 0.60 | 0.60 |
| Mean particle diameter (μm) | 105 | 105 | 100 | 100 | 110 |

TABLE IV

| | Example according to the invention 12 | Comparative example 13 | Example according to the invention 14 | Comparative example 15 |
|---|---|---|---|---|
| Autoclave capacity (m³) | 0.4 | 0.4 | 36 | 36 |
| Quantity of polymer used (t) | 0.16 | 0.16 | 15 | 15 |
| Rate of rotation of the instant stirrer or of the corresponding stirrer Bo (rev/min) | 30 | 30 | 20 | 20 |
| Power consumed (kW) | 0.6 | 0.75 | 115 | 130 |
| Turnover time (s) | 16 | 70 | 24 | 120 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A vertical autoclave for carrying out operations involving a medium having a liquid phase and/or a solid phase, comprising:
   a. a concave shaped autoclave bottom;
   b. a shaft along a vertical axis of said autoclave, said shaft passing through said bottom of said autoclave; and
   c. at least one stirrer arm attached to said vertical shaft for driving said medium with a centripetal motion about said concave autoclave bottom said stirrer arm having a shape matching the shape of said concave bottom of said autoclave and being attached so that said arm is adjacent said concave bottom.

2. The autoclave of claim 1, wherein:
   a. said autoclave further comprises a minimum working zone at a lower end of said autoclave; and
   b. said stirrer arm is capable of driving with centripetal motion at least any component unit of a volume of said medium situated in a minimum working zone of the lower end of said autoclave.

3. The autoclave of claim 2, wherein said stirrer arm is curved such that a peripheral end thereof, in the direction of rotation, is angularly ahead of an opposite end attached to said vertical shaft.

4. The autoclave of claim 2, wherein a center angle $\phi$ of a top view of a minimum working part of a leading line of said stirrer arm, is in a range of $+5$ to $+90$ degrees.

5. The autoclave of claim 2, wherein an angle of curvature $\alpha$ of a top view of the minimum working part of a leading line of said stirrer arm at any point F along said minimum working part of said leading line is between $+0$ and $+90$ degrees.

6. The autoclave of claim 4 or 5, wherein said angle of curvature $\alpha$ is substantially constant from a central point $K_1$ to a peripheral point $K_2$ of the minimum working part of a projection (C) of said leading line onto a plane (P) perpendicular to said axis.

7. The autoclave of claim 6, wherein a radius r of said vertical shaft is between 0.10 R and 0.25 R, R being a radius of the autoclave.

8. The autoclave of claim 7, wherein a distance d, from said axis of the autoclave, to points on a surface of said stirrer arm which are the furthest away from said axis, is equal to or greater than 0.5 R and less than R, R being the radius of the autoclave.

9. The autoclave of claim 8, wherein a ratio r/d is between 0.1 and 0.5, r being the radius of the shaft and d being such as defined in claim 8.

10. The autoclave of claim 9, wherein a distance h of an outermost peripheral point J of a projection (G) of a lower line of the stirrer arm in any plane (Q) passing through the axis of the autoclave to a radius of a bottom flange of the autoclave is between $-0.65$ R and $+0.30$ R, R being the radius of the autoclave.

11. The autoclave of claim 10, wherein a distance e, from a central point D of the projection (C) of the leading line to a central point D' of a projection (C') of a trailing line of the stirrer arm, is at most equal to 2 r and is preferably between 0.75 r and 1.50 r, r being the radius of the shaft.

12. The autoclave of claim 11, wherein a distance e', from a central point H of the projection (G) of the lower line to a central point H' of a projection (G') of an upper line of the stirrer arm in said plane Q, is between 0.05 R and 0.5 R, R being the radius of the autoclave.

13. The autoclave of claim 12, wherein the size of the surface area of a surface S bounded by an elevation projection of a contour of a front face of the stirrer arm is between $0.1 R^2$ and $0.5 R^2$, R being the radius of the autoclave.

14. The autoclave of claim 13, wherein a cross section (s) of the stirrer arm in a plane at right angles to its leading line at any point M whose projection in a plane (P) perpendicular to the axis of the autoclave is a point situated on the minimum working part of the projection (C), is such that, M', N and N' are points of meeting of the cross section (s) and of the trailing line of said stirrer arm and of the lower and upper lines of the contour of the front face of the stirrer arm, respectively; $a_1$, $a_2$, $a_3$, and $a_4$ are the apexes of a rectangle, with two horizontal sides, circumscribed on the cross section (s); $a_1 a_2$, $a_3 a_4$, $a_1 a_4$, and $a_2 a_3$ are the sides of said rectangle on which the points M, M', N and N' are situated, respectively, whatever the shape of the cross section (s):
   a ratio of distances $Ma_1/a_1a_2$ is less than 0.20 and preferably less than 0.05,
   a part MN' of the said cross section (s), situated on the front face of the stirrer arm, has essentially a substantially rectilinear profile forming, with the side $a_1a_2$, an angle $\beta$ which is zero or at most equal to 45 degrees at a point of the leading line whose projection in the plane (P) is the central point $K_1$ of the minimum working part of the projection (C) and gradually decreasing, when the point M moves on the leading line in the direction corresponding to the movement from the central point $K_1$ to the peripheral point $K_2$ of the minimum working part of the projection (C), to a value which is eventually zero,
   a ratio of distances $Na_1/a_1a_4$ is less than 0.20 and preferably less than 0.15, and
   a part NM' of said cross section, situated on a face, viewed from below, of the stirrer arm, has essentially a substantially rectilinear profile forming with the side $a_1 a_4$, an angle $\gamma$ of between 3 and 10 degrees and preferably between 5 and 10 degrees.

15. The autoclave of claim 14, wherein the cross section (s) of the surface of the stirrer arm in a plane at right angles to its leading line at any point M is such that, when the point M moves on the leading line in a direction corresponding to the movement from a central point D to a peripheral point E of the projection (C), the length of the sides of the rectangle, with two horizontal sides, circumscribed on the said cross section (s), is decreasing.

16. The autoclave of claim 15, wherein it comprises at least one other stirrer, the other stirrer or stirrers and the stirrer according to the invention being controlled independently.

17. The autoclave of claim 16, wherein the other stirrer has a rotary shaft passing through an upper part of the autoclave.

18. The autoclave of claim 16, wherein there is only one other stirrer and its rotary shaft is directed along the axis of the autoclave.

19. The autoclave of claim 18, wherein the other stirrer consists essentially of a band wound in helical turns on said rotary shaft.

20. The autoclave of claim 4, wherein the center angle $\phi$ of the top view of the minimum working part of the leading line of said stirrer arm is in a range of $+8°$ $+45°$.

* * * * *